United States Patent [19]
Shima et al.

[11] Patent Number: 5,797,555
[45] Date of Patent: Aug. 25, 1998

[54] TAPE CASSETTE

[75] Inventors: Motohiko Shima; Masaru Ikebe, both of Nagano, Japan

[73] Assignee: TDK Corporation, Japan

[21] Appl. No.: 966,063

[22] Filed: Nov. 10, 1997

[30] Foreign Application Priority Data

Nov. 11, 1996 [JP] Japan .................... 8-312644

[51] Int. Cl.$^6$ .................................. G11B 23/087
[52] U.S. Cl. ........................................ 242/347
[58] Field of Search .................. 242/347; 360/132

[56] References Cited

U.S. PATENT DOCUMENTS

| | | |
|---|---|---|
| 4,363,456 | 12/1982 | Goto . |
| 4,831,482 | 5/1989 | Sato . |
| 5,075,811 | 12/1991 | Goto ........................ 360/132 |
| 5,468,065 | 11/1995 | Ishikawa ................... 360/132 |
| 5,516,056 | 5/1996 | Kwon et al. ............... 242/347 |
| 5,567,917 | 10/1996 | Shimokuni ................ 242/347 |

FOREIGN PATENT DOCUMENTS

| | | |
|---|---|---|
| 0 071 996 | 2/1983 | European Pat. Off. . |
| 2-123772 | 10/1990 | Japan . |
| 2 024 775 | 1/1980 | United Kingdom ......... 360/132 |
| 2 261 867 | 6/1993 | United Kingdom ......... 360/132 |
| 2 262 276 | 6/1993 | United Kingdom . |
| 2 269 362 | 2/1994 | United Kingdom . |

*Primary Examiner*—John P. Darling
*Attorney, Agent, or Firm*—Lerner, David, Littenberg, Krumholz & Mentlik

[57] ABSTRACT

A tape cassette capable of permitting a parting line during manufacturing of a die for molding a casing thereof to be kept constant to accomplish joining between an upper casing member and a lower casing member with increased accuracy and facilitate incorporation of components for the cassette into the casing. The upper casing member has tapping bosses for screwing provided thereon and having the same height as a peripheral wall thereof. The lower casing member has tapping bosses, at least one of which also functions as a reference hole, and which have a height greater than a peripheral thereof. The tapping bosses of the lower casing member which are arranged on opposite sides of a front portion of the casing are each formed on a peripheral wall thereof with a cutout so as to fit therein a portion of a front wall of the upper casing member. Alternatively, the front wall of the upper casing member is formed with cutouts in proximity to respective tapping bosses, each of which cutouts is arranged so as to fit therein a portion of a peripheral wall of a corresponding one of the tapping bosses of the lower casing member.

11 Claims, 8 Drawing Sheets

TAPE CASSETTE

BACKGROUND OF THE INVENTION

This invention relates to a tape cassette which is suitable for use for a recording/reproducing apparatus, in particular, a magnetic recording/reproducing apparatus such as, for example, a video tape recorder (VTR) or the like, and more particularly to a video tape cassette such as an 8 mm video cassette, a digital video cassette or the like which is so constructed that a tape-like medium or tape is received in a cassette casing while being wound on tape reels and a lock member is arranged therein so as to regulate or restrain release of a lid structure for covering a portion of the tape in non-use of the tape cassette.

In a conventional tape cassette, upper and lower casing members have the same thickness and are assembled into a casing by joining the upper and lower casing members to each other by means of screws inserted into the casing members from the lower casing member. The conventional tape cassette is so constructed that the upper and lower casing members have peripheral walls of the same height in view of a parting line during molding thereof by a die. Further, the upper and lower casing members are each provided thereon with tapping bosses into which the screws are inserted for joining of the upper and lower casing members to each other. The tapping bosses of the lower casing member have the same height as the peripheral wall of the lower casing member and the tapping bosses of the upper casing member have a height greater than the peripheral wall of the upper casing member. When the upper and lower casing members are combined with each other, the tapping bosses of the upper casing member higher than the peripheral wall of the upper casing member are fitted in the tapping bosses of the lower casing member which have a size greater than the tapping bosses of the upper casing member, followed by joining of both casing members to each other by means of the screws. Such a conventional tape cassette is disclosed in, for example, Japanese Utility Model Application Laid-Open Publication No. 123772/1990.

Alternatively, another conventional tape cassette is constructed so that a rib or front wall arranged along a reel area defined on a front side of the upper casing member has a height smaller than a height of the tapping bosses of the upper casing member and that of a side wall of the upper casing member. Unfortunately, a configuration of the conventional tape cassette causes a variation in a parting line during manufacturing of a die to be required, to thereby render manufacturing of the die highly troublesome and time-consuming. In particular, in the tape cassette wherein some of the tapping bosses are constructed so as to also function as reference holes, it is required to form each of such tapping bosses with a hole having a depth sufficient to permit a reference pin of a recording/reproducing apparatus to be inserted thereinto. However, the above-described construction of the conventional tape cassette in which the tapping bosses of the lower casing member have the same height as the peripheral wall of the lower casing member fails to permit proper insertion of the reference pin into a respective one of the tapping bosses due to interference of the reference pin with a head of the screw.

In order to avoid the problem, it would be considered that only the tapping bosses of the lower casing member which include ones required to also function as the reference holes are formed with an increased height and the tapping bosses of the upper casing member are formed with a reduced height. However, such an approach causes a vertical position of a mating surface between the upper casing member and the lower casing member to be varied depending on a region of the casing; so that a gap sufficient to cause intrusion of dust into the casing therethrough occurs between the upper casing member and the lower casing member during joining therebetween, leading to drop-out.

Another approach wherein a height of the peripheral wall of the lower casing member is increased to a level as high as the tapping bosses and a height of the peripheral wall of the upper casing member is relatively reduced would be also considered. However, such an increase in height or thickness of the lower casing member renders incorporation of components for the tape cassette into the casing substantially difficult.

Further, it would be considered that the tapping bosses of the lower casing member are formed with the same increased height and correspondingly the tapping bosses of the upper casing member are reduced in height. However, this fails in mating between front walls of the upper and lower casing members which define a front space along the reel area, to thereby prevent the tape cassette from being put to practical use.

Alternatively, it would be considered that the front wall of each of the upper and lower casing members is formed to have the same height as the tapping bosses thereof. Unfortunately, this likewise causes a vertical position of a mating surface between the upper casing member and the lower casing member to be varied depending on a region of the casing, leading to such a disadvantage as described above.

SUMMARY OF THE INVENTION

The present invention has been made in view of the foregoing disadvantages of the prior art.

Accordingly, it is an object of the present invention to provide a tape cassette which is capable of permitting a parting line to be kept unvaried during manufacturing of a molding die for a casing of the tape cassette.

It is another object of the present invention to provide a tape cassette which is capable of facilitating incorporation of components for the tape cassette into a casing for the tape cassette.

It is a further object of the present invention to provide a tape cassette which is capable of accomplishing assembling of upper and lower casing members into a cassette casing with increased accuracy.

It is still another object of the present invention to provide a tape cassette which is capable of increasing operational reliability of the tape cassette to a degree sufficient to substantially increase a commercial value of the tape cassette.

It is a still further object of the present invention to provide a tape cassette which is capable of significantly reducing both a period of time required for manufacturing a die for a casing and a cost of thereof.

In accordance with the present invention, a tape cassette is provided. The tape cassette includes a casing including an upper casing member and a lower casing member. The upper and lower casing members are respectively provided thereon with tapping bosses and joined to each other by means of screws inserted into the tapping bosses from the lower casing member, to thereby provide the casing. The tape cassette also includes a pair of tape reels rotatably received in the casing and having a tape wound thereon so as to extend therebetween. The tape is arranged so as to travel between the tape reels while being guided along a front surface of the casing, to thereby be led out of one of the tape reels and taken up on the other tape reel. The tape cassette further includes a lid structure arranged on the casing in a manner to be opened and closed so as to permit the tape to be selectively exposed therethrough from the casing. The upper and lower casing members each have a peripheral wall, the walls having the same height. The tapping bosses of the upper casing member each have the same height as the peripheral wall of the upper casing member. The tapping bosses of the lower casing member are each formed with a height greater than the peripheral wall of the lower casing member and arranged so that at least one of the tapping bosses of the lower casing member also functions as a reference hole into which a reference pin of a recording/reproducing apparatus is fitted when the tape cassette is inserted into the recording/reproducing apparatus. The peripheral walls of the upper and lower casing members include front walls, respectively, each of which is connected with a respective one of the tapping bosses through a connection section. The connection section between the front wall and the tapping boss of one of the upper and lower casing members is formed therein with a cutout. The cutout is arranged so as to fit therein a portion of the connection section of the other one of the upper and lower casing members when the upper and lower casing members are combined with each other.

In a preferred embodiment of the present invention, the front walls of the upper and lower casing members are each formed along a reel area. The peripheral walls of the upper and lower casing members each include a rear wall and two side walls, wherein the rear walls, the side walls and the front walls have the same height. The tapping bosses of the lower casing member are fittedly engaged with the respective tapping bosses of the upper casing member so that the upper and lower casing members are joined to each other by means of the screws inserted into the tapping bosses engaged with each other.

In a preferred embodiment of the present invention, two of the tapping bosses of the upper casing member and two of the tapping bosses of the lower casing member are disposed on opposite sides of a front portion of the casing in such a manner that each opposite end of each of the front walls is contiguous to a respective one of the two of the tapping bosses of the upper casing member and the two of the tapping bosses of the lower casing member. The cutout is arranged on a peripheral wall of each of the tapping bosses of the lower casing member which are arranged on the opposite sides of the front portion of the casing. The cutout is shaped in the form of a recessed groove in which a portion of the front wall of the upper casing member is fitted.

In a preferred embodiment of the present invention, two of the tapping bosses of the upper casing member and two of the tapping bosses of the lower casing member are disposed on opposite sides of a front portion of the casing in such a manner that each opposite end of each of the front walls is contiguous to a respective one of the two of the tapping bosses of the upper casing member and the two of the tapping bosses of the lower casing member. The cutout is arranged at a portion of the front wall of the upper casing member which is contiguous to a corresponding one of the tapping bosses of the upper casing member. The cutout is shaped in the form of a recessed groove in which a portion of a peripheral wall of a corresponding one of the tapping bosses of the lower casing member is fitted.

In a preferred embodiment of the present invention, the tapping bosses of the lower casing member are each formed on an upper end thereof with a hole in which a distal end of a corresponding one of the tapping bosses of the upper casing member is fitted.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
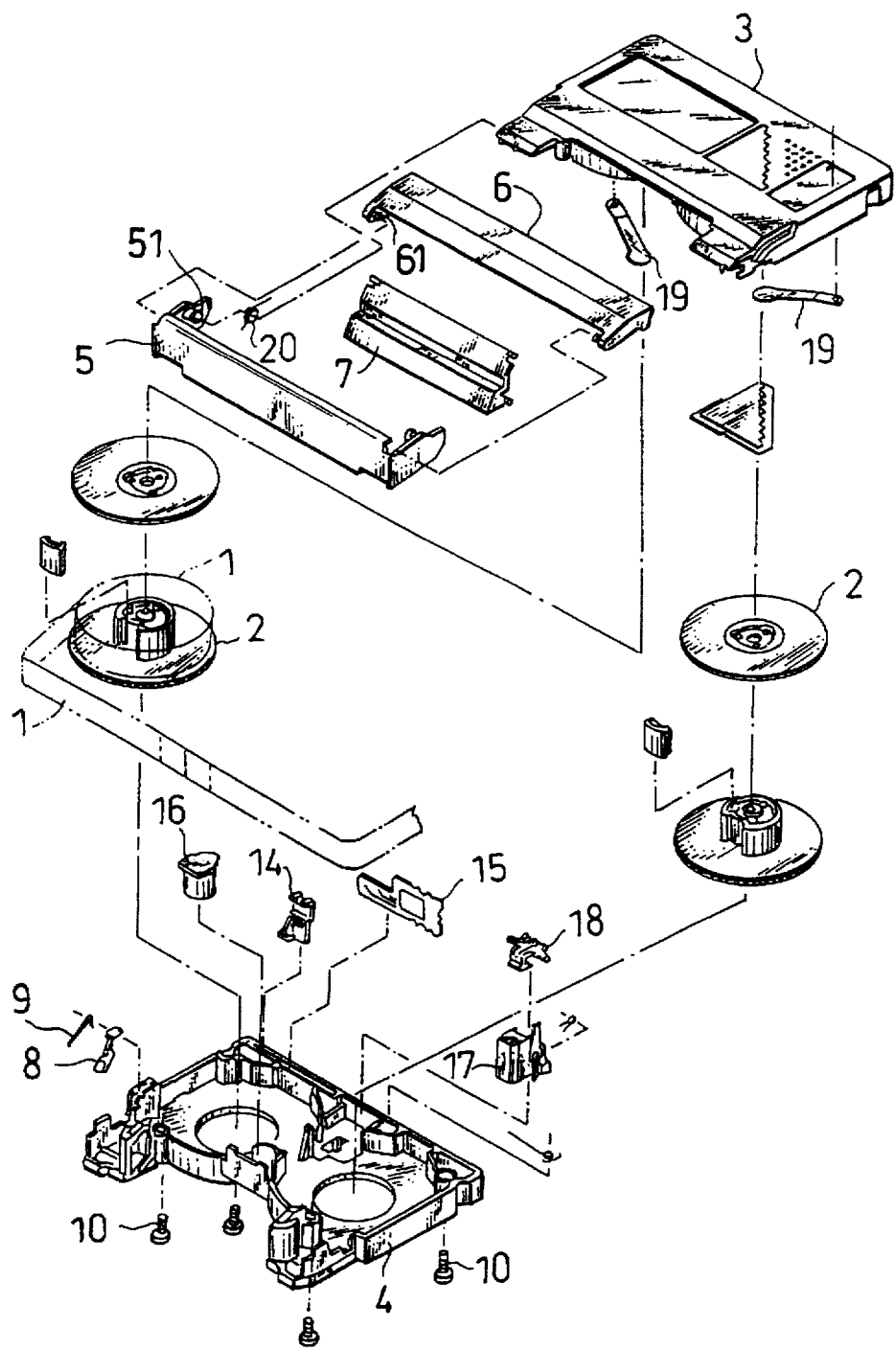
FIG. 1 is an exploded perspective view showing an embodiment of a tape cassette according to the present invention.

Now, a tape cassette according to the present invention will be described hereinafter with reference to the accompanying drawings.

Referring first to FIGS. 1 to 6, a first embodiment of a tape cassette according to the present invention is illustrated. A tape cassette of the illustrated embodiment includes a casing constituted by joining an upper casing member 3 and a lower casing member 4 to each other. The tape cassette also includes a pair of tape reels 2 rotatably arranged in the casing. The tape reels 2 have a tape 1 wound thereon so as to extend therebetween while being stretched therebetween. The tape 1 is arranged so as to travel between the tape reels 2 while being guided along a front surface of the casing, to thereby be led out of one of the tape reels 2 and taken up on the other tape reel 2. The tape cassette also includes a lid structure for permitting the tape 1 to be selectively exposed therethrough from the casing. The lid structure includes a front lid 5 for covering a front surface of a portion of the tape 1 guided along the front surface of the casing, an upper lid 6 for covering an upper end of the portion of the tape 1 and a rear lid 7 for covering a rear surface of the portion of the tape 1 and is arranged on the casing in a manner to be opened and closed. The lid structure further includes a front lid lock member 8 which includes a holding pawl for locking the front lid 5. The front lid lock member 8 is urged by a spring member 9 so as to disengageably engage with an engagement portion formed at the front lid 5.

The upper and lower casing members 3 and 4 each include respective peripheral walls 30 and 40 having the same height. The upper casing member 3 is provided on an inner surface thereof with first tapping bosses 34, each of which has the same height as the peripheral wall 30 thereof. The lower casing member 4 is provided on an inner surface thereof with second tapping bosses 44, which are formed to have a height greater by an amount or size t than the peripheral wall 40 thereof and at least one of which is arranged so as to also function as a reference hole when the tape cassette is inserted into a recording/reproducing apparatus. Further, the upper and lower casing members 3 and 4 have front walls 33 and 43, respectively. Each of the front walls 33 and 43 is connected at opposite ends thereof with the respective tapping bosses 34 or 44 through a connection section. The connection section between the front wall 33 or 43 and the tapping boss 34 or 44 of one of the upper and lower casing members 3 and 4 is formed therein with a cutout. The cutout is arranged so as to fit therein a portion of the connection section of the other one of the upper and lower casing members 3 and 4 when the upper and lower casing members are combined with each other for providing the casing. In the illustrated embodiment, the cutouts 45 are arranged in two of the tapping bosses 44 which are disposed on opposite sides of a front portion of the lower casing member 4 in a manner to be contiguous to the front wall 43 of the lower casing member 4. As shown in FIGS. 2 to 6, the cutouts 45 are each shaped in the form of a recessed groove and formed in a peripheral wall of a respective one of the tapping bosses 44 of the lower casing member 4 so as to fit therein a portion of the front wall 33 in proximity to a corresponding one of the tapping bosses 34 of the upper casing member 3. The cutouts 45 thus arranged permit the upper and lower casing members 3 and 4 to be conformed to each other while preventing any gap from being formed therebetween.

In the illustrated embodiment, the upper casing member 3 and lower casing member 4 are each so constructed that a rear wall 31 or 41 thereof, two side walls 32 or 42 thereof and the front wall 33 or 43 defined along a reel area, which cooperate with each other to constitute the peripheral wall 30 or 40 thereof, are formed to have the same height. The tapping bosses 44 of the lower casing member 4 which have a height greater than the peripheral wall 40 of the lower casing member 4 are fitted in or on the tapping bosses 34 of the upper casing member 3. In the illustrated instance, the tapping bosses 44 of the lower casing member 4 are each formed on an upper end thereof with a hole in which a distal end of a corresponding one of the tapping bosses 34 of the upper casing member 4 is fitted. The upper and lower casing members 3 and 4 are joined to each other by means of screws 10 inserted into the respective bosses 34 and 44 of both casing members 3 and 4 thus fittedly engaged with each other.

At least one of the tapping bosses 44 of the lower casing member 4 also functions as the reference hole, as described above. The lower casing member 4 is provided at a center of the front portion thereof with a hole 46 in which a light emitting element (not shown) of the recording/reproducing apparatus is received to detect an end of the tape 1.

The side walls 42, rear wall 41 and front wall 43 of the lower casing member 4 which constitute the peripheral wall 40 of the lower casing member 4 have the same height and only the tapping bosses 44 of the lower casing member 4 are formed with a height greater than the peripheral wall 40 thereof. Such formation of the peripheral wall 40 of the constant height permits the casing to be assembled with increased accuracy and facilitates machining or working of a molding die for the casing members.

In the first embodiment described above, the front wall 43 of the lower casing member 4 is formed at a central portion 43a thereof with an increased height as compared with the remaining portion thereof in order to define the hole 46 in which the light emitting element is received. The central portion 43a of the front wall 43 of the lower casing member 4 is formed in such a manner as not to have any mating surface with the upper casing member 3 in view of a function thereof.

Alternatively, in a second embodiment shown in FIGS. 7 to 10, cutouts 35 are each arranged on a front wall 33 of an upper casing member 3 in proximity to a respective one of tapping bosses 34 and shaped in the form of a recessed groove in which a corresponding one of tapping bosses 44 of a lower casing member 4 is fitted so as to absorb a height difference t of each of the tapping bosses 44. In the second embodiment, the cutouts 35 are not provided at the tapping bosses 44 of the lower casing member 4 positioned on the front side thereof. Instead, the cutouts 35 are provided on the front wall 33 of the upper casing member 3 positionally corresponding to the tapping bosses 44 of the lower casing member 4. The cutouts 35 thus arranged permit the upper and lower casing members 3 and 4 to be conformed to each other while preventing any gap from being formed therebetween. The remaining part of the second embodiment may be constructed in a manner similar to the first embodiment.

In each of the first and second embodiments, at least one of the tapping bosses 44 functions as the reference hole as well as the means for joining the casing members 3 and 4 to each other using the screws 10. All of the tapping bosses 44 of the lower casing member 4 are formed with a height greater than the peripheral wall 40 of the lower casing member 4. The peripheral wall 40 of the lower casing member 4 are formed in a manner to be flush or have the constant height almost along the whole length thereof. Also, the peripheral wall 30 of the upper casing member 3 is substantially entirely formed with the constant height so as to conform to that of the lower casing member 4 and the tapping bosses 34 of the upper casing member 3 are formed so as to be flush with the peripheral wall 30 thereof.

Figure 9A:
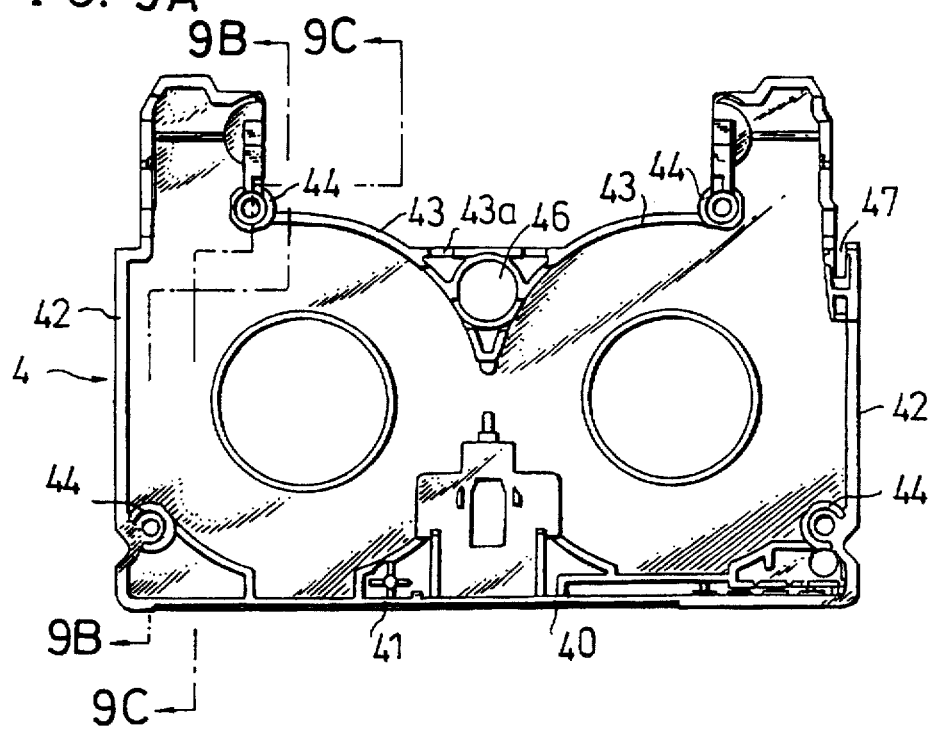
FIG. 9A is a plan view showing an inside of the lower casing member shown in FIG. 7.
Figure 9B:
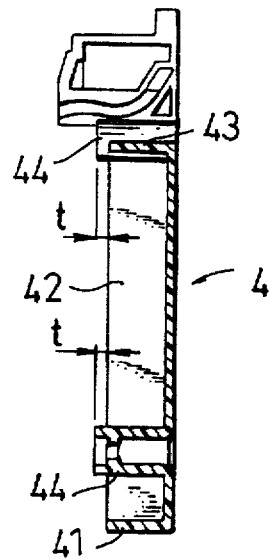
FIG. 9B is a sectional view taken along line 9B—9B of FIG. 9A.
Figure 9C:
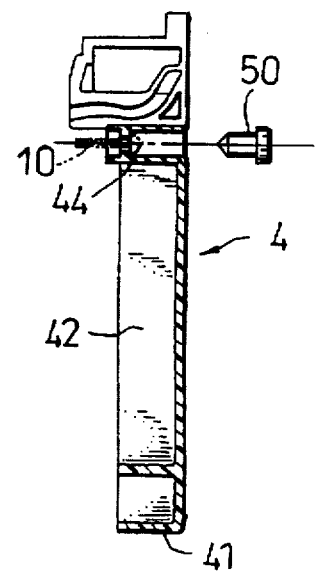
FIG. 9C is a sectional view taken along line 9C—9C of FIG. 9A.
Figure 10:
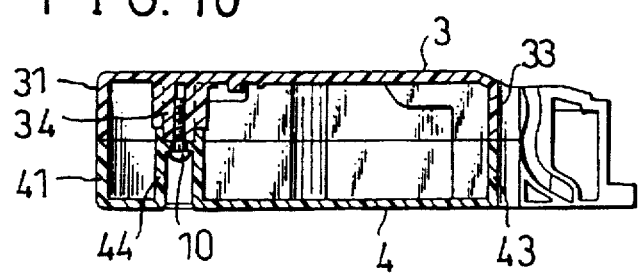
FIG. 10 is a vertical sectional view of the casing shown in FIG. 7 which has the upper and lower casing members joined to each other.

When the tapping bosses 44 of the lower casing member 4 are constructed so as to function also as the reference holes, the tapping bosses 44 acting as the reference hole each have a reference pin 50 of the recording/reproducing apparatus inserted therein, as shown in FIG. 9C. Also, the tapping bosses 44 each function as a screw hole as well. Thus, each of the tapping bosses 44 functioning as the reference hole as well as the screw hole is formed on a lower side thereof with a hole having a depth greater than a sum of a length of insertion of the reference pin 50 and a thickness or height of a head of the screw 10, and therefore, a height of the tapping boss 44 is increased correspondingly.

Figure 2:
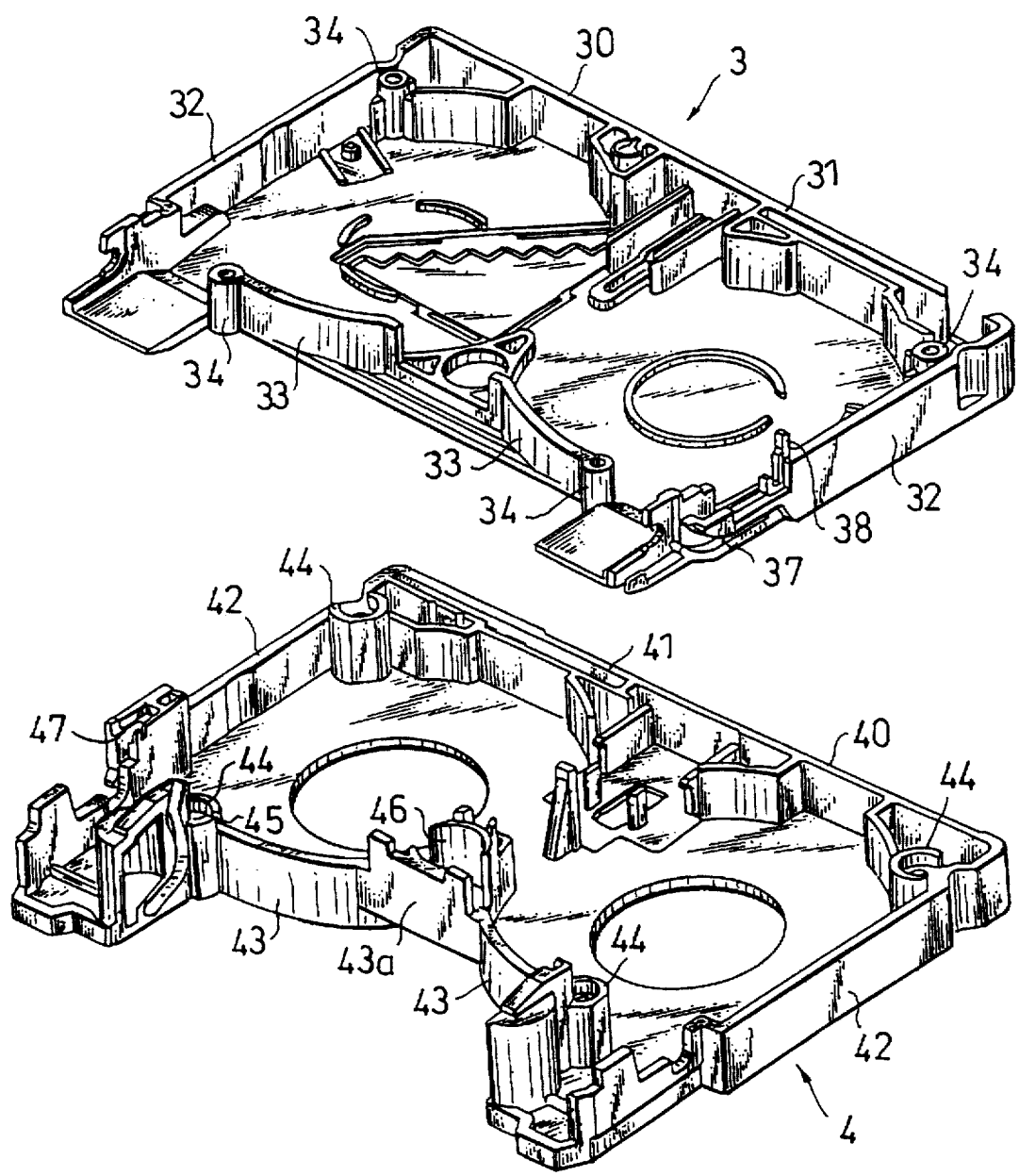
FIG. 2 is an exploded perspective view showing a casing for the tape cassette shown in FIG. 1 wherein upper and lower casing members are separated from each other while keeping the upper casing member turned over.
Figure 3A:
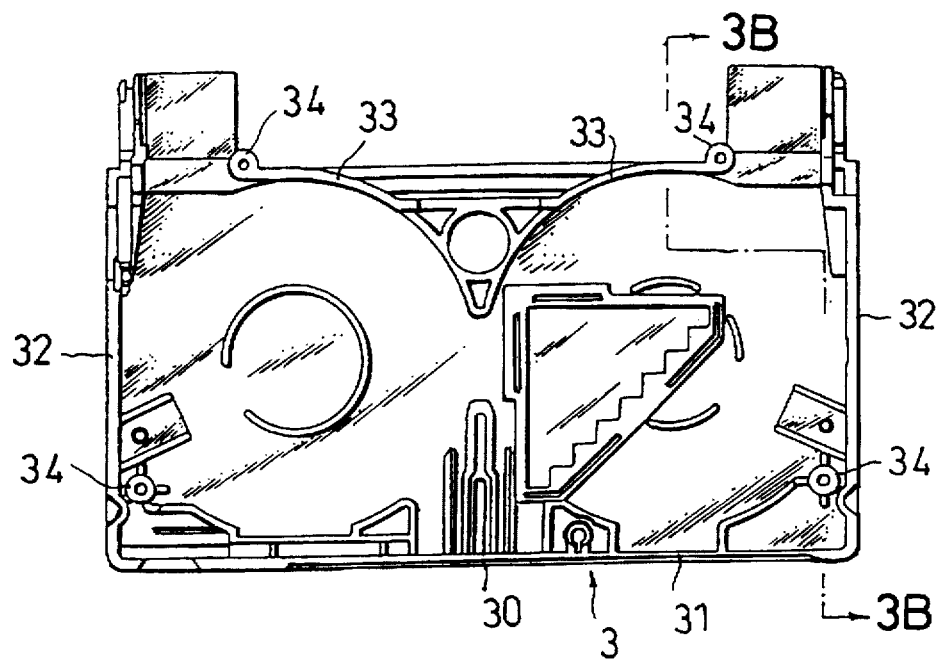
FIG. 3A is a plan view showing an inside of the upper casing member shown in FIG. 2.
Figure 3B:
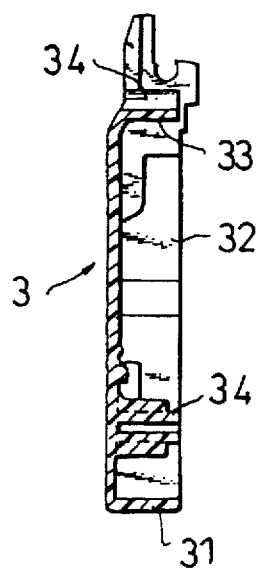
FIG. 3B is a sectional view taken along line 3B—3B of FIG. 3A.
Figure 4A:
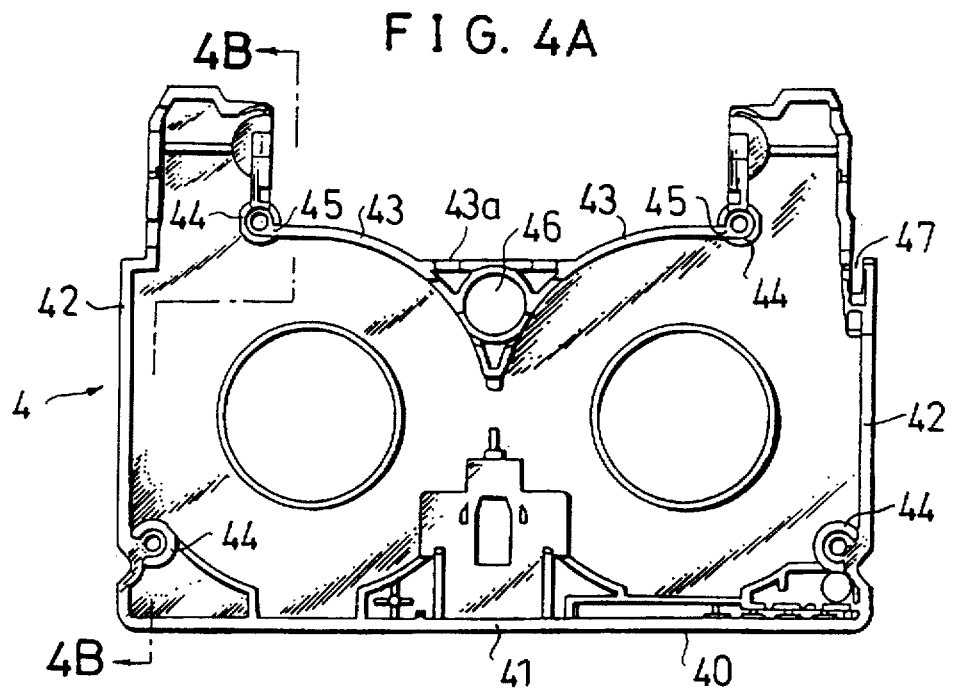
FIG. 4A is a bottom view showing an inside of the lower casing member shown in FIG. 2.
Figure 4B:
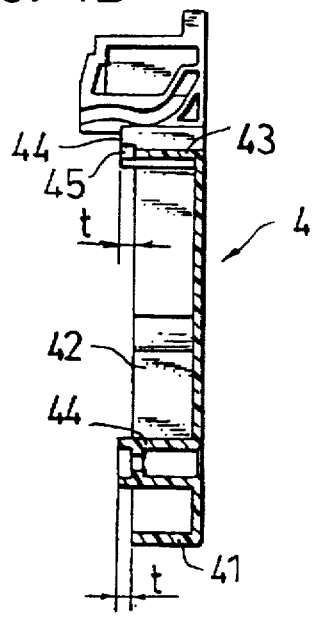
FIG. 4B is a sectional view taken along line 4B—4B of FIG. 4A.
Figure 5:
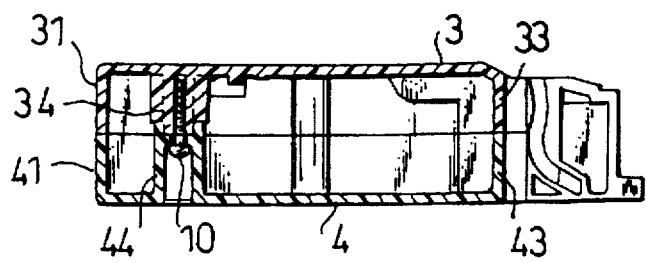
FIG. 5 is a vertical sectional view of the casing shown in FIG. 2 which has the upper and lower casing members joined to each other.
Figure 6:
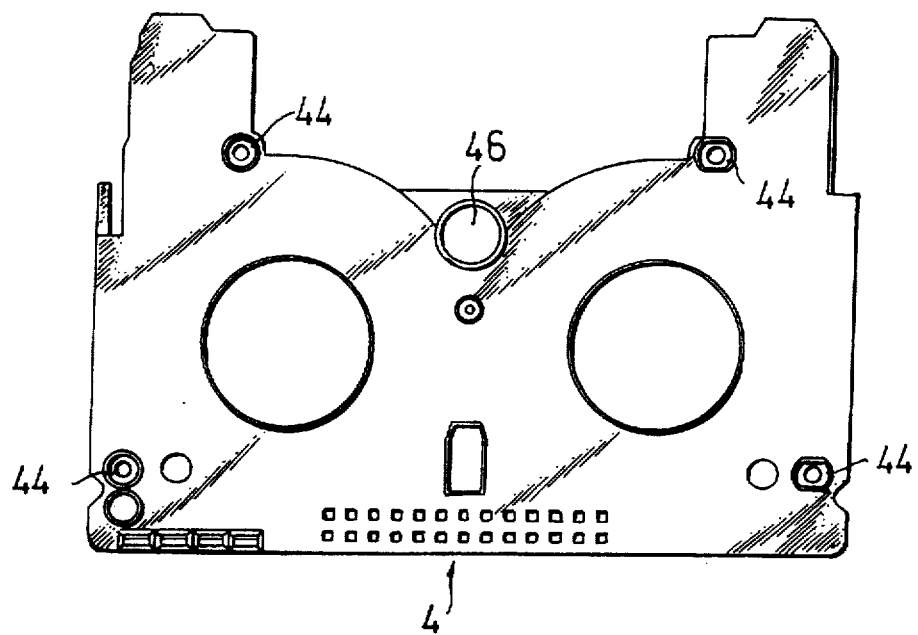
FIG. 6 is a bottom view of the lower casing member shown in FIG. 2.
Figure 7:
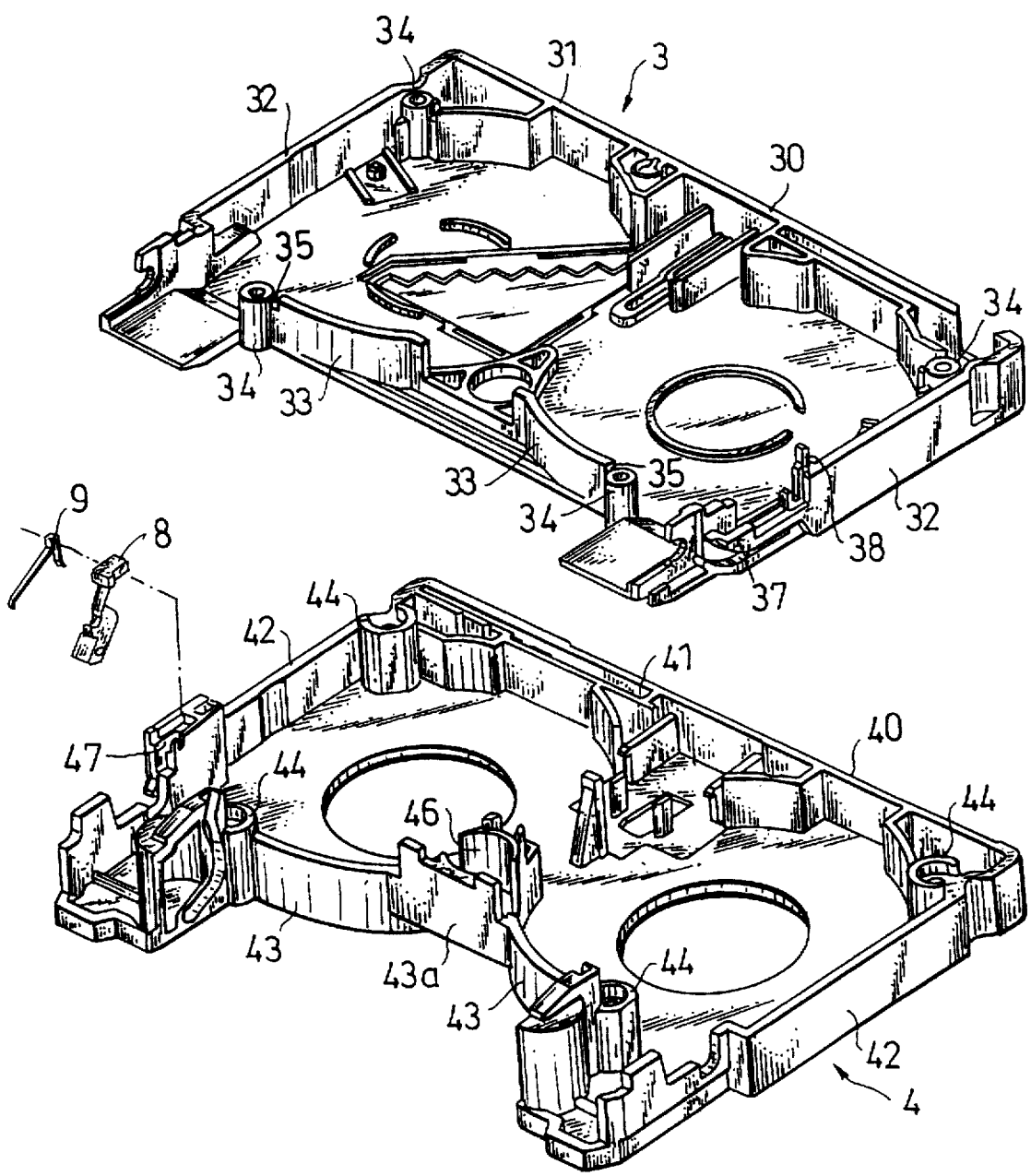
FIG. 7 is an exploded perspective view showing a casing for another embodiment of a tape cassette according to the present invention, wherein upper and lower casing members are separated from each other while keeping the upper casing member turned over.
Figure 8A:
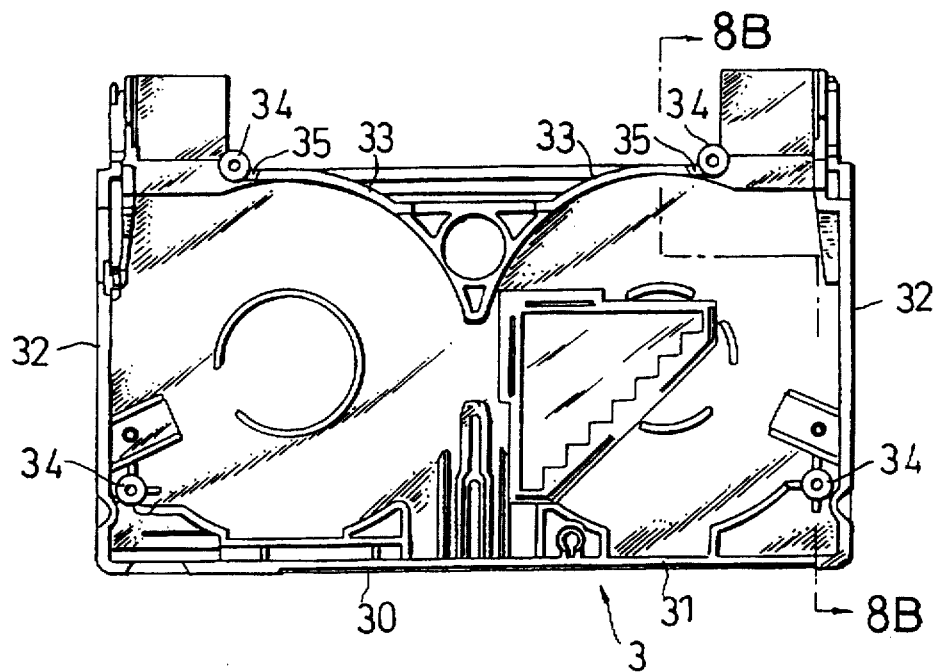
FIG. 8A is a bottom view showing an inside of the upper casing member shown in FIG. 7.
Figure 8B:
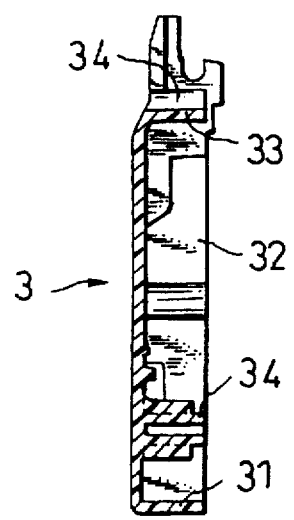
FIG. 8B is a sectional view taken along line 8B—8B of FIG. 8A.

The upper casing member 3, as shown in each of FIGS. 2 and 7, may be provided with a holding rib 38 of an inverted U-shape at a portion of a side surface of the front portion thereof which is positioned inside a cam groove portion 37 in which one of support shafts 61 of the upper lid 6 is slid and decreased in thickness, so that fixing between the front lid lock member 8 and the spring member 9 may be accomplished by means of a front lid lock section 47. Such construction facilitates assembling of the tape cassette.

In the drawings, reference numeral 14 designates a plug, 15 is an MIC (memory IC), 16 is an optical cover, 17 is a reel brake, 18 is a brake lock, 19 is a tape reel holding spring, 20 is a front lid spring, and 51 is a front lid support shaft.

As can be seen from the foregoing, the tape cassette of the present invention is characterized in that: the upper and lower casing members each include the peripheral wall, the peripheral walls having the same height; the tapping bosses of the upper casing member each have the same height as the peripheral wall of the upper casing member; the tapping bosses of the lower casing member are formed with a height greater than the peripheral wall of the lower casing member and arranged so that at least one of the tapping bosses of the lower casing member also functions as a reference hole into which a reference pin of a recording/reproducing apparatus is fitted when the tape cassette is inserted into the recording/reproducing apparatus; the peripheral walls of the upper and lower casing members include front walls, respectively, each of which is connected with a respective one of the tapping bosses through a connection section, the connection section between the front wall and the tapping boss of one of the upper and lower casing members being formed therein with a cutout; and the cutout is arranged so as to fit therein a portion of the connection section of the other one of the upper and lower casing members when the upper and lower casing members are combined with each other.

Such construction of the present invention permits a parting line to be kept unvaried during manufacturing of a die for the casing members because the tapping bosses of the upper casing member and the peripheral wall of the upper casing member, including the front wall along the reel area on the front side of the casing member, have the same height. In addition, even when the tape cassette of the present invention is constructed into a structure wherein some of the tapping bosses of the upper and lower casing members for screwing each also function as the reference holes and the tapping bosses of the lower casing member is formed with a height greater than the peripheral wall of the lower casing member, the above-described construction of the present invention facilitates incorporation of the parts into the casing and accomplishes assembling of the upper and lower casing members with increased accuracy, because the peripheral walls of the upper and lower casing members have the same height. Thus, the present invention provides the tape cassette with increased operational reliability to a degree sufficient to substantially increase a commercial value of the tape cassette. Also, it significantly reduces both a period of time and a cost required for manufacturing a molding die.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A tape cassette comprising:

a casing including an upper casing member and a lower casing member, said upper and lower casing members being respectively provided thereon with tapping bosses, said upper and lower casing members being joined to each other by means of screws inserted into said tapping bosses from said lower casing member, to thereby provide said casing;

a pair of tape reels rotatably received in said casing and having a tape wound thereon so as to extend therebetween, said tape being arranged so as to travel between said tape reels while being guided along a front surface of said casing, to thereby be led out of one of said tape reels and taken up on the other tape reel; and a lid structure arranged on said casing in a manner to be opened and closed so as to permit said tape to be selectively exposed therethrough from said casing;

said upper and lower casing members each including a peripheral wall, said peripheral walls having the same height;

said tapping bosses of said upper casing member each having the same height as said peripheral wall of said upper casing member;

said tapping bosses of said lower casing member being formed with a height greater than said peripheral wall of said lower casing member and arranged so that at least one of said tapping bosses of said lower casing member also functions as a reference hole into which a reference pin of a recording/reproducing apparatus is fitted when the tape cassette is inserted into the recording/reproducing apparatus;

said peripheral walls of said upper and lower casing members including front walls respectively, each of which is connected with a respective one of said tapping bosses through a connection section, said connection section between said front wall and the tapping boss of one of said upper and lower casing members being formed therein with a cutout;

said cutout being arranged so as to fit therein a portion of said connection section of the other one of said upper and lower casing members when said upper and lower casing members are combined with each other.

2. A tape cassette as defined in claim 1, wherein said front walls of said upper and lower casing members are each formed along a reel area;

said peripheral walls of said upper and lower casing members each include a rear wall and two side walls, said rear walls, said side walls and said front walls having the same height; and said tapping bosses of said lower casing member are fittedly engaged with the respective tapping bosses of said upper casing member so that said upper and lower casing members are joined to each other by means of said screws inserted into said tapping bosses engaged with each other.

3. A tape cassette as defined in claim 2, wherein two of said tapping bosses of said upper casing member and two of said tapping bosses of said lower casing member are disposed on opposite sides of a front portion of said casing in such a manner that each opposite end of each of said front walls is contiguous to a respective one of said two of said tapping bosses of said upper casing member and said two of said tapping bosses of said lower casing member;

said cutout is arranged on a peripheral wall of each of the tapping bosses of said lower casing member which are arranged on the opposite sides of said front portion of the casing; and said cutout is shaped in the form of a recessed groove in which a portion of said front wall of said upper casing member is fitted.

4. A tape cassette as defined in claim 3, wherein said tapping bosses of said lower casing member are each formed on an upper end thereof with a hole in which a distal end of a corresponding one of said tapping bosses of said upper casing member is fitted.

5. A tape cassette as defined in claim 2, wherein two of said tapping bosses of said upper casing member and two of said tapping bosses of said lower casing member are disposed on opposite sides of a front portion of the casing in such a manner that each opposite end of each of said front walls is contiguous to a respective one of said two of said tapping bosses of said upper casing member and said two of said tapping bosses of said lower casing member;

said cutout is arranged at a portion of said front wall of said upper casing member which is contiguous to a corresponding one of said tapping bosses of said upper casing member; and said cutout is shaped in the form of a recessed groove in which a portion of a peripheral wall of a corresponding one of said tapping bosses of said lower casing member is fitted.

6. A tape cassette as defined in claim 5, wherein said tapping bosses of said lower casing member are each formed on an upper end thereof with a hole in which a distal end of a corresponding one of said tapping bosses of said upper casing member is fitted.

7. A tape cassette as defined in claim 2, wherein said tapping bosses of said lower casing member are each formed on an upper end thereof with a hole in which a distal end of a corresponding one of said tapping bosses of said upper casing member is fitted.

8. A tape cassette as defined in claim 1, wherein two of said tapping bosses of said upper casing member and two of said tapping bosses of said lower casing member are disposed on opposite sides of a front portion of said casing in such a manner that each opposite end of each of said front walls is contiguous to a respective one of said two of said tapping bosses of said upper casing member and said two of said tapping bosses of said lower casing member;

said cutout is arranged on a peripheral wall of each of the tapping bosses of said lower casing member which are arranged on the opposite sides of said front portion of the casing; and said cutout is shaped in the form of a recessed groove in which a portion of said front wall of said upper casing member is fitted.

9. A tape cassette as defined in claim 1, wherein two of said tapping bosses of said upper casing member and two of said tapping bosses of said lower casing member are disposed on opposite sides of a front portion of the casing in such a manner that each opposite end of each of said front walls is contiguous to a respective one of said two of said tapping bosses of said upper casing member and said two of said tapping bosses of said lower casing member;

said cutout is arranged at a portion of said front wall of said upper casing member which is contiguous to a corresponding one of said tapping bosses of said upper casing member; and said cutout is shaped in the form of a recessed groove in which a portion of a peripheral wall of a corresponding one of said tapping bosses of said lower casing member is fitted.

10. A tape cassette comprising:

a casing including an upper casing member and a lower casing member, said upper and lower casing members being respectively provided thereon with first tapping bosses and second tapping bosses, said upper and lower casing members being joined to each other by means of screws inserted into said first and second tapping bosses from said lower casing member, to thereby provide said casing;

a pair of tape reels rotatably received in said casing and having a tape wound thereon so as to extend therebetween, said tape being arranged so as to travel between said tape reels while being guided along a front surface of said casing, to thereby be led out of one of said tape reels and taken up on the other tape reel; and a lid structure arranged on said casing in a manner to be opened and closed so as to permit said tape to be selectively exposed therethrough from said casing;

said upper and lower casing members each including a peripheral wall, said peripheral walls having the same height;

said first tapping bosses of said upper casing member each having the same height as said peripheral wall thereof of said upper casing member;

said second tapping bosses of said lower casing member being each formed with a height greater than said peripheral wall of said lower casing member and arranged so that at least one of said second tapping bosses of said lower casing member also functions as a reference hole into which a reference pin of a recording/reproducing apparatus is fitted when the tape cassette is inserted into the recording/reproducing apparatus;

said peripheral walls of said upper and lower casing members including rear walls, two side walls and front walls, respectively;

two of said first tapping bosses and two of said second tapping bosses being disposed on opposite sides of a front portion of said casing in such a manner that each opposite end of each of said front walls is contiguous to a respective one of said two of said first tapping bosses and said two of said second tapping bosses;

said two of said second tapping bosses of said lower casing member each being formed on a peripheral wall thereof with a recessed groove so as to fit therein a portion of said front wall of said upper casing member when said upper and lower casing members are combined with each other.

11. A tape cassette comprising:

a casing including an upper casing member and a lower casing member, said upper and lower casing members being respectively provided thereon with first tapping bosses and second tapping bosses, said upper and lower casing members being joined to each other by means of screws inserted into said first and second tapping bosses from said lower casing member, to thereby provide said casing;

a pair of tape reels rotatably received in said casing and having a tape wound thereon so as to extend therebetween, said tape being arranged so as to travel between said tape reels while being guided along a front surface of said casing, to thereby be led out of one of said tape reels and taken up on the other tape reel; and a lid structure arranged on said casing in a manner to be opened and closed so as to permit said tape to be selectively exposed therethrough from said casing;

said upper and lower casing members each including a peripheral wall, said peripheral walls having the same height;

said first tapping bosses of said upper casing member each having the same height as said peripheral wall of said upper casing member;

said second tapping bosses of said lower casing member being each formed with a height greater than said peripheral wall of said lower casing member and arranged so that at least one of said second tapping bosses of said lower casing member also functions as a reference hole into which a reference pin of a recording/reproducing apparatus is fitted when the tape cassette is inserted into the recording/reproducing apparatus;

said peripheral walls of said upper and lower casing members including rear walls, two side walls and front walls, respectively;

two of said first tapping bosses and two of said second tapping bosses being disposed on opposite sides of a front portion of said casing in such a manner that each opposite end of each of said front walls is contiguous to a respective one of said two of said first tapping bosses and said two of said second tapping bosses;

said front wall of said upper casing member being formed with recessed grooves in proximity to the respective tapping bosses so that each of said recessed grooves is adapted to fit therein a portion of a peripheral wall of a corresponding one of said two of said tapping bosses of said lower casing member when said upper and lower casing members are combined with each other.

* * * * *